US012073990B2

(12) United States Patent
Yamakita

(10) Patent No.: US 12,073,990 B2
(45) Date of Patent: *Aug. 27, 2024

(54) METHOD OF MANUFACTURING WINDING-TYPE ELECTRONIC COMPONENT

(71) Applicant: Murata Manufacturing Co., Ltd., Kyoto-fu (JP)

(72) Inventor: Takayuki Yamakita, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 11 days.

This patent is subject to a terminal disclaimer.

(21) Appl. No.: 18/051,735

(22) Filed: Nov. 1, 2022

(65) Prior Publication Data

US 2023/0112263 A1 Apr. 13, 2023

Related U.S. Application Data

(60) Division of application No. 16/719,269, filed on Dec. 18, 2019, now Pat. No. 11,515,087, which is a (Continued)

(30) Foreign Application Priority Data

May 19, 2014 (JP) ................................ 2014-102971

(51) Int. Cl.
*H01F 41/076* (2016.01)
*B65H 54/02* (2006.01)
(Continued)

(52) U.S. Cl.
CPC ......... *H01F 41/076* (2016.01); *B65H 54/026* (2013.01); *H01F 41/07* (2016.01); *H01F 41/082* (2016.01)

(58) Field of Classification Search
CPC ....... H01F 41/07; H01F 41/082; H01F 41/076
See application file for complete search history.

(56) References Cited

U.S. PATENT DOCUMENTS 3,273,812 A * 9/1966 Lacasse ............. B65H 54/2836 156/169
5,263,639 A * 11/1993 Lee ...................... H01F 41/076 29/605

(Continued)

FOREIGN PATENT DOCUMENTS

CN 102362323 B 5/2013
EP 2197006 A1 * 11/1994 ........... H01F 41/077

(Continued)

OTHER PUBLICATIONS

International Search Report issued in PCT/JP2015/062565; mailed Jul. 14, 2015.

(Continued)

*Primary Examiner* — Jeffrey T Carley
(74) *Attorney, Agent, or Firm* — Studebaker & Brackett PC

(57) ABSTRACT

A method of manufacturing a winding-type electronic component using stranded wires which can suppress a disconnection of a winding when a plurality of windings is twisted. The method of manufacturing a winding-type electronic component includes: a preparation step of allowing a chuck to hold a core having a winding core portion (14) and flange portions; a first step of fixing a portion of each of windings supplied from nozzles (N1, N2) to the flange portion; and a second step of twisting the windings by rotating the chuck.

6 Claims, 12 Drawing Sheets

Related U.S. Application Data division of application No. 15/354,382, filed on Nov. 17, 2016, now Pat. No. 10,546,690, which is a continuation of application No. PCT/JP2015/062565, filed on Apr. 24, 2015.

(51) Int. Cl.

| | |
|---|---|
| ***H01F 41/07*** | (2016.01) |
| ***H01F 41/082*** | (2016.01) |

(56) References Cited

U.S. PATENT DOCUMENTS

| | | | | |
|---|---|---|---|---|
| 5,457,872 | A | 10/1995 | Sakata et al. | |
| 10,692,639 | B2 * | 6/2020 | Jerez | H01F 41/076 |
| 10,723,583 | B2 * | 7/2020 | Maki | B65H 54/026 |
| 2004/0103525 | A1 * | 6/2004 | Kim | H01F 41/122 29/745 |
| 2004/0263285 | A1 * | 12/2004 | Suzuki | H01F 41/082 333/185 |
| 2005/0229390 | A1 * | 10/2005 | Romagnoli | B21F 45/00 29/748 |
| 2005/0285707 | A1 * | 12/2005 | Furuya | H01F 41/076 336/208 |
| 2008/0203213 | A1 * | 8/2008 | Noji | H02K 15/095 242/433.1 |
| 2012/0304462 | A1 * | 12/2012 | Wei | H01F 41/07 29/874 |
| 2014/0306789 | A1 * | 10/2014 | Hirai | H01F 17/045 336/188 |
| 2015/0206646 | A1 * | 7/2015 | Dinh | H01F 17/045 336/188 |
| 2016/0351329 | A1 * | 12/2016 | Kanno | H01F 41/07 |
| 2016/0379756 | A1 * | 12/2016 | Yamakita | H01F 41/069 242/439.1 |
| 2018/0370752 | A1 * | 12/2018 | Maki | H01F 41/094 |

FOREIGN PATENT DOCUMENTS

| | | | |
|---|---|---|---|
| EP | 2 197 006 | A1 | 6/2010 |
| JP | H06-325938 | A | 11/1994 |
| JP | H10-050542 | A | 2/1998 |
| JP | 2003-109836 | A | 4/2003 |
| JP | 2004-119922 | A | 4/2004 |
| JP | 2010-147132 | A | 7/2010 |
| TW | I402870 | B | 7/2013 |

OTHER PUBLICATIONS

Written Opinion issued in PCT/JP2015/062565; mailed Jul. 14, 2015.

International Preliminary Report On Patentability issued in PCT/JP2015/062565; issued on Nov. 22, 2016.

Search Report issued by the Taiwanese Patent Office on Jan. 25, 2017, which corresponds to Taiwanese Patent Application No. 104112199 and is related to U.S. Appl. No. 15/354,382.

The First Notification of Office Action issued by the State Intellectual Property Office of China on Jul. 28, 2017, which corresponds to Chinese Patent Application No. 201580025665.0 and is related to U.S. Appl. No. 15/354,382; with English language translation.

* cited by examiner

METHOD OF MANUFACTURING WINDING-TYPE ELECTRONIC COMPONENT

CROSS REFERENCE TO RELATED APPLICATIONS

This application is a Divisional of U.S. patent application Ser. No. 16/719,269 filed Dec. 18, 2019, which is a Divisional of U.S. patent application Ser. No. 15/354,382 filed Nov. 17, 2016, and claims benefit of priority to Japanese Patent Application 2014-102971 filed May 19, 2014, and to International Patent Application No. PCT/JP2015/062565 filed Apr. 24, 2015, the entire content of which is incorporated herein by reference.

TECHNICAL FIELD

The present disclosure relates to a method of manufacturing a winding-type electronic component, and more particularly to a method of manufacturing a winding-type electronic component using stranded wires.

BACKGROUND

As a conventional method of manufacturing a winding-type electronic component using stranded wires, there has been known a method of manufacturing a winding-type coil part described in Japanese Patent Application Laid-Open No. 2010-147132. In this type of method of manufacturing a winding-type electronic component (hereinafter referred to as "conventional method of manufacturing a winding-type electronic component"), a plurality of conductive wires is stranded, and these stranded wires are wound on a winding core portion. As shown in FIG. 19, a manufacturing apparatus used in the conventional method of manufacturing a winding-type electronic component is formed of: a tensioner 502 for applying a proper tension to conductive wires 501 at the time of winding the conductive wires 501 on a core 504 of a winding-type electronic component; a nozzle 503 for feeding the conductive wires 501 to a winding core portion of the core 504; and a chuck, not shown in the drawing, for holding and rotating the core 504, which are arranged in this order from an upstream side from which the conductive wires 501 are supplied. In winding the conductive wires 501 on the winding core portion of the core 504, the conductive wires 501 fed from the nozzle 503 are entangled with each other, and the core 504 is rotated by the chuck thus winding the plurality of conductive wires 501 on the winding core portion. Simultaneously with such an operation, the plurality of conductive wires is stranded by rotating the nozzle 503.

In the conventional method of manufacturing a winding-type electronic component, at the time of winding the conductive wires 501 on the winding core portion of the core 504, the nozzle 503 which feeds the conductive wires 501 is rotated, thereby stranding the plurality of conductive wires. In this case, the conductive wires 501 are stranded also between the tensioner 502 and the nozzle 503. As a result, a tension force from the tensioner 502 is not properly transmitted to the conductive wires on a downstream side of the nozzle 503; and, further, there is a possibility that the conductive wires 501 are disconnected at a portion where the conductive wires 501 are stranded between the tensioner 502 and the nozzle 503.

SUMMARY

Problem to be Solved by the Disclosure

It is an object of the present disclosure to provide a method of manufacturing a winding-type electronic component using stranded wires, wherein the method can suppress a disconnection of a winding when a plurality of windings is twisted.

Means for Solving the Problem

According to a first aspect of the present disclosure, there is provided a method of manufacturing a winding-type electronic component which includes: a preparation step of allowing a rotatable chuck to hold a core having a winding core portion and flange portions;

a first step of fixing a portion of each of a plurality of windings supplied from a nozzle to one of the flange portions; and a second step of twisting the plurality of windings by rotating the chuck.

According to a second aspect of the present disclosure, there is provided a method of manufacturing a winding-type electronic component, wherein a plurality of windings supplied from a nozzle is wound on a winding core portion by rotating a chuck that holds a core having the winding core portion and flanges, the method including:

a first step of fixing a portion of each of the plurality of windings to one of the flange portions;

a second step of twisting the plurality of windings by rotating the chuck; and a third step of winding the plurality of windings twisted in the second step on the winding core portion.

In the method of manufacturing a winding-type electronic component according to the first aspect of the present disclosure, a portion of each of the plurality of windings is fixed to one of the flange portions of the core, and the plurality of windings is twisted by rotating the chuck which holds the core. Accordingly, unlike the conventional method of manufacturing a winding-type electronic component, the nozzle is not rotated; and, hence, there is no possibility that the plurality of windings is twisted between a member on an upstream side of the nozzle and the nozzle.

Advantageous Effect of the Disclosure

According to the present disclosure, in the method of manufacturing a winding-type electronic component using stranded wires, a disconnection of the winding at the time of twisting a plurality of windings can be suppressed.

DETAILED DESCRIPTION

Mode for Carrying Out the Disclosure

Configuration of Winding-Type Electronic Component: See FIGS. 1 and 2

A winding-type electronic component 1 manufactured by a method of manufacturing a winding-type electronic component according to a first embodiment is described with reference to some drawings. Hereinafter, a direction along which a center axis of a winding core portion 14 extends is defined as an x-axis direction. Further, as viewed in the x-axis direction, a direction along a long side of a flange portion 16 is defined as a y-axis direction, and a direction along a short side of the flange portion 16 is defined as a z-axis direction. An x-axis, a y-axis and a z-axis are orthogonal to each other.

Figure 1:
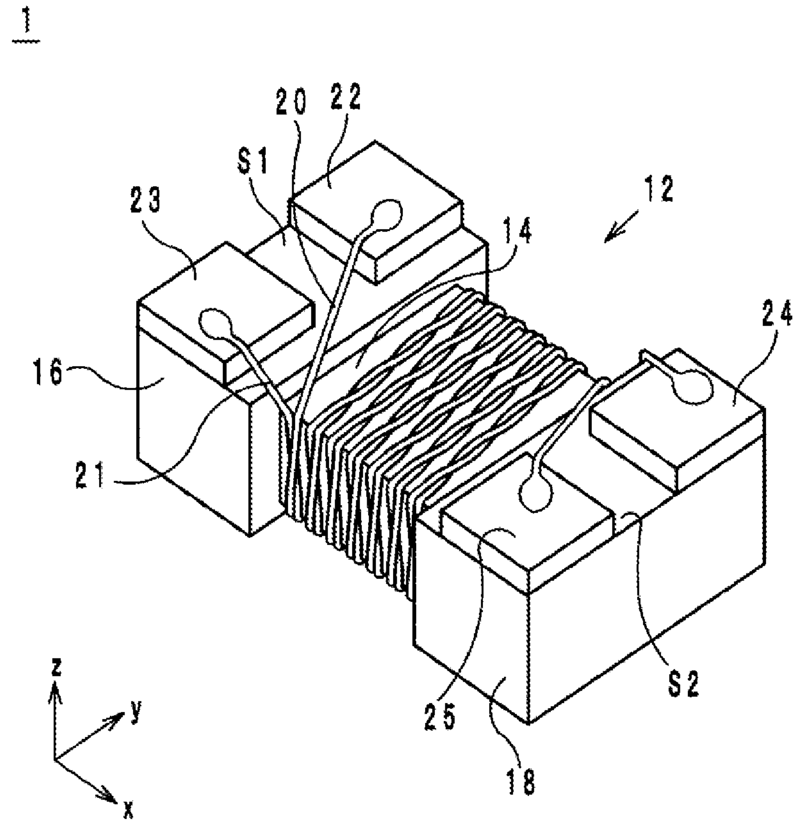
FIG. 1 is an external appearance view of a winding-type electronic component manufactured by a manufacturing method according to a first embodiment.

As shown in FIG. 1, the winding-type electronic component 1 includes a core 12, windings 20, 21, and external electrodes 22 to 25.

The core 12 is made of a magnetic material such as ferrite or alumina, for example, and includes a winding core portion 14 and flange portions 16, 18.

The winding core portion 14 is a prismatic member extending in the x-axis direction. However, the shape of the winding core portion 14 is not limited to a prismatic shape, and may have a circular columnar shape.

The flange portions 16, 18 respectively have an approximately rectangular parallelepiped shape, and are provided on both ends of the winding core portion 14 in the x-axis direction. To be more specific, the flange portion 16 is provided on one end of the winding core portion 14 on a negative direction side in the x-axis direction. The flange portion 18 is provided on the other end of the winding core portion 14 on a positive direction side in the x-axis direction.

The external electrodes 22 to 25 are respectively made of an Ni-based alloy such as Ni—Cr, Ni—Cu or Ni, Ag, Cu, Sn or the like. The external electrodes 22 to 25 respectively have an approximately rectangular shape as viewed from a positive direction side in the z-axis direction.

The external electrodes 22, 23 are provided on a surface S1 of the flange portion 16 on a positive direction side in the z-axis direction such that the external electrodes 22, 23 are arranged, in this order, in a row from a positive direction side to a negative direction side in the y-axis direction. In this case, the external electrodes 22, 23 are arranged in a row with a space between them such that the external electrodes 22, 23 are not brought into contact with each other.

The external electrodes 24, 25 are provided on a surface S2 of the flange portion 18 on a positive direction side in the z-axis direction such that the external electrodes 24, 25 are arranged, in this order, in a row from a positive direction side to a negative direction side in the y-axis direction. In this case, the external electrodes 24, 25 are arranged in a row with a space between them such that the external electrodes 24, 25 are not brought into contact with each other.

The windings 20, 21 are conductive wires each of which is formed such that a core wire made mainly of a conductive material such as copper or silver is covered by an insulating material such as polyurethane or the like. The windings 20, 21 are twisted so as to form one stranded wire and the stranded wire is wound on the winding core portion 14.

One end of the winding 20 on a negative direction side in the x-axis direction is connected to the external electrode 22 on the surface S1, and the other end of the winding 20 on a positive direction side in the x-axis direction is connected to the external electrode 24 on the surface S2.

One end of the winding 21 on a negative direction side in the x-axis direction is connected to the external electrode 23 on the surface S1, and the other end of the winding 21 on a positive direction side in the x-axis direction is connected to the external electrode 25 on the surface S2.

Manufacturing Method: See FIGS. 2 to 17

Hereinafter, a method of manufacturing the winding-type electronic component according to the first embodiment is described. The x-axis direction used in the description of the manufacturing method is a direction along which a center axis of the winding core portion 14 of the winding-type electronic component 1 manufactured by the manufacturing method extends. The y-axis direction used in the description of the manufacturing method is a direction along which the long side of the flange portion 16 extends when the core 12 is fixed to a chuck C1, and the z-axis direction used in the description of the manufacturing method is a direction along which the short side of the flange portion 16 extends when the core 12 is fixed to the chuck C1.

In the manufacture of the winding-type electronic component of the first embodiment, firstly, powder which contains ferrite as a main component and is used as a material for forming the core 12 is prepared. Then, the ferrite powder prepared in this manner is filled in a female die. By pressing the powder filled in the female die by a male die, the filled powder is molded to form a compact having a shape of the winding core portion 14 and shapes of the flange portions 16, 18.

Next, after the compact having portions corresponding to the winding core portion 14 and the flange portions 16, 18 is molded, the compact is baked, and forming of the core 12 is completed.

To form the external electrodes 22 to 25, an Ag paste is applied to both end portions of the surfaces S1, S2 of the flange portions 16, 18, respectively, in the y-axis direction. Next, adhered Ag paste is dried and baked so that Ag films which form base electrodes for the external electrodes 22 to 25 are formed. Then, a metal film made of an Ni-based alloy is formed on the Ag film by applying an electroplating or the like. The external electrodes 22 to 25 are formed in accordance with the above-mentioned steps.

Figure 2:
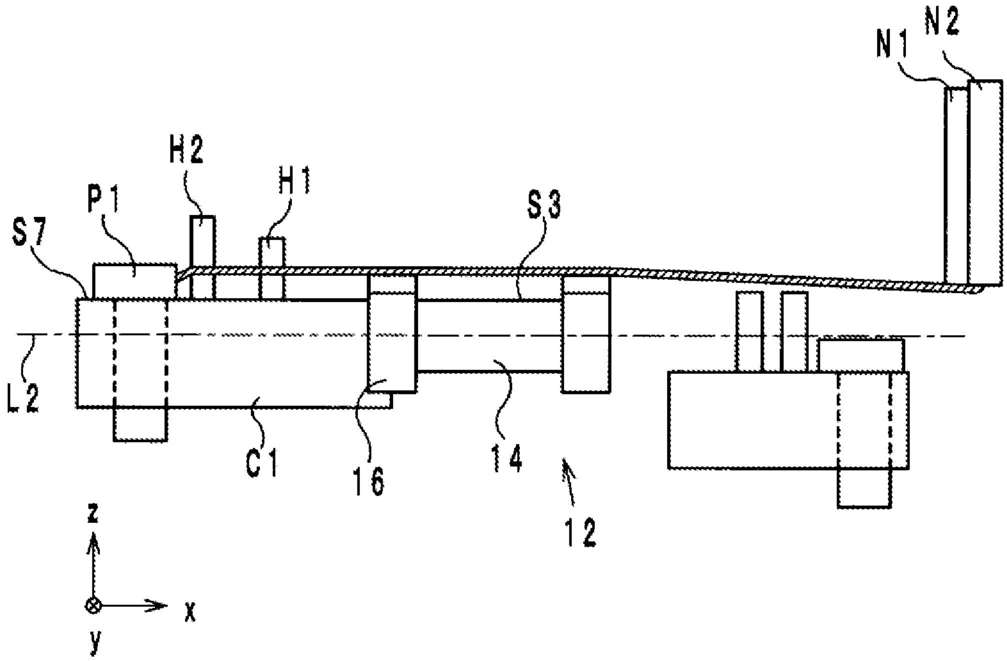
FIG. 2 is a view showing a first step of a method of manufacturing the winding-type electronic component according to the first embodiment.
Figure 3:
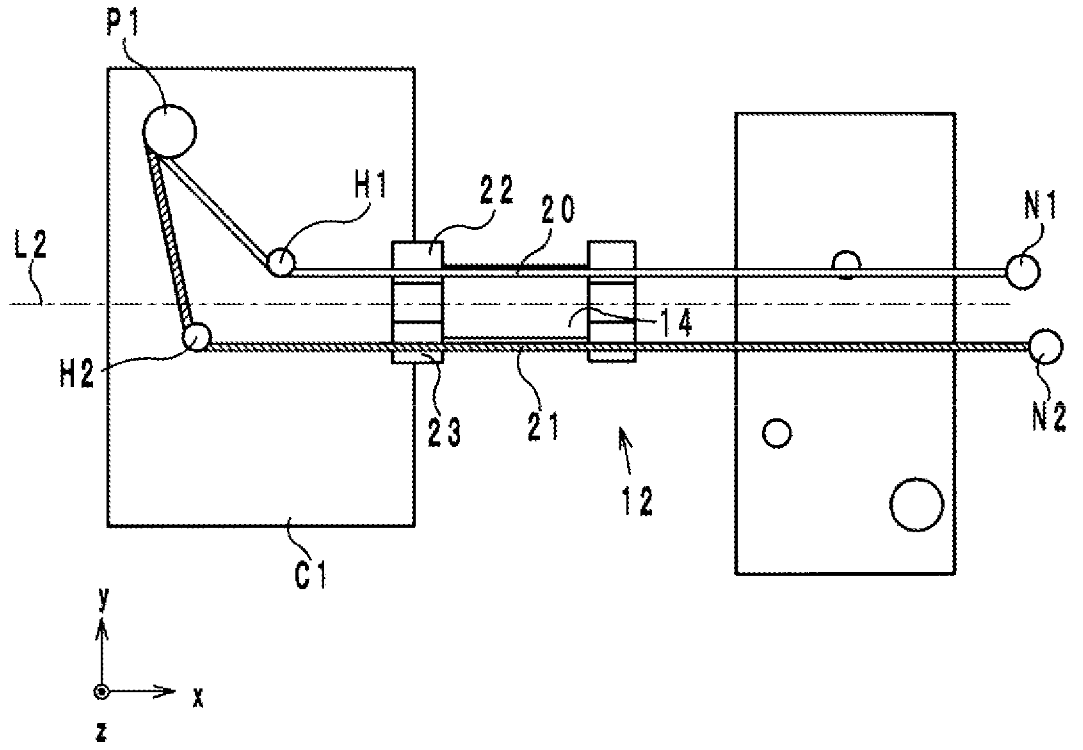
FIG. 3 is a view showing the first step of the method of manufacturing the winding-type electronic component according to the first embodiment.

Next, as shown in FIGS. 2 and 3, firstly, the core 12 is fixed to the chuck C1. The core 12 is fixed to the chuck C1 by grasping the flange portion 16 of the core 12 by the chuck. Then, the chuck C1 is connected to a rotary drive device, not shown in the drawings, so that the chuck C1 is rotatable using a center axis L2 of the winding core portion 14 of the core 12 as an axis of rotation (completion of preparation step).

In a first step of fixing the windings 20, 21, a second step of twisting the windings 20, 21, and a third step of winding the windings 20, 21 on the winding core portion 14 to be described later, a proper tension is constantly applied to the windings 20, 21 with a tensioner not shown in the drawings.

After the core 12 is fixed to the chuck C1, one end of the winding 20 supplied from a nozzle N1 and one end of the winding 21 supplied from a nozzle N2 are clamped by a wire clamp P1 provided on the chuck C1. The wire clamp P1 is provided on a surface S7 of the chuck C1 which is approximately parallel to the surface S3 of the winding core portion 14 of the core 12 on a positive direction side in the z-axis direction, and is positioned on a negative direction side in the x-axis direction and on a positive direction side in the y-axis direction with respect to the core 12. Then, nozzles N1, N2 are connected to a drive unit not shown in the drawings, and are movable in an arbitrary direction in a three-dimensional space.

Next, the winding 20 is hooked on a hooking pin H1. The hooking pin H1 is a rod-like member provided on the surface S7 of the chuck C1, and is disposed between the wire clamp P1 and the core 12 in the x-axis direction and at substantially the same position as that of the external electrode 22 provided on the core 12 in the y-axis direction. The winding 20 is brought into contact with a side surface on a negative direction side in the y-axis direction of the hooking pin H1 disposed as described above, thereby moving the nozzle N1 to a positive direction side in the x-axis direction with respect to the core 12. Due to such a movement of the nozzle N1, the winding 20 is hooked on the hooking pin H1 while being brought into contact with the external electrode 22. Further, the nozzle N1 is positioned in the vicinity of an extension of the center axis L2 of the core 12.

In parallel with the operation of hooking the winding 20 on the hooking pin H1, the winding 21 is hooked on a hooking pin H2. The hooking pin H2 is a rod-like member provided on the surface S7 of the chuck C1, and is disposed between the wire clamp P1 and the core 12 in the x-axis direction and at substantially the same position as that of the external electrode 23 provided on the core 12 in the y-axis direction. The winding 21 is brought into contact with a side surface on a negative direction side in the y-axis direction of the hooking pin H2 disposed as described above, thereby moving the nozzle N2 to a positive direction side in the x-axis direction with respect to the core 12. Due to such a movement of the nozzle N2, the winding 21 is hooked on the hooking pin H2 while being brought into contact with the external electrode 23. The nozzle N2 is positioned in the vicinity of the extension of the center axis L2 of the core 12.

Figure 4:
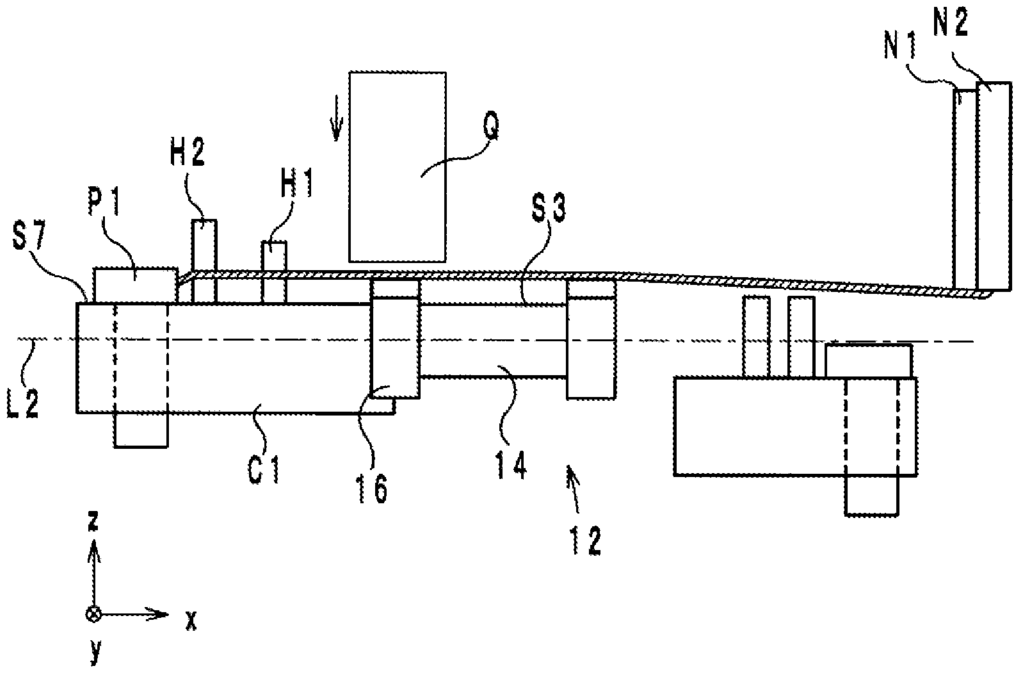
FIG. 4 is a view showing the first step of the method of manufacturing the winding-type electronic component according to the first embodiment.
Figure 5:
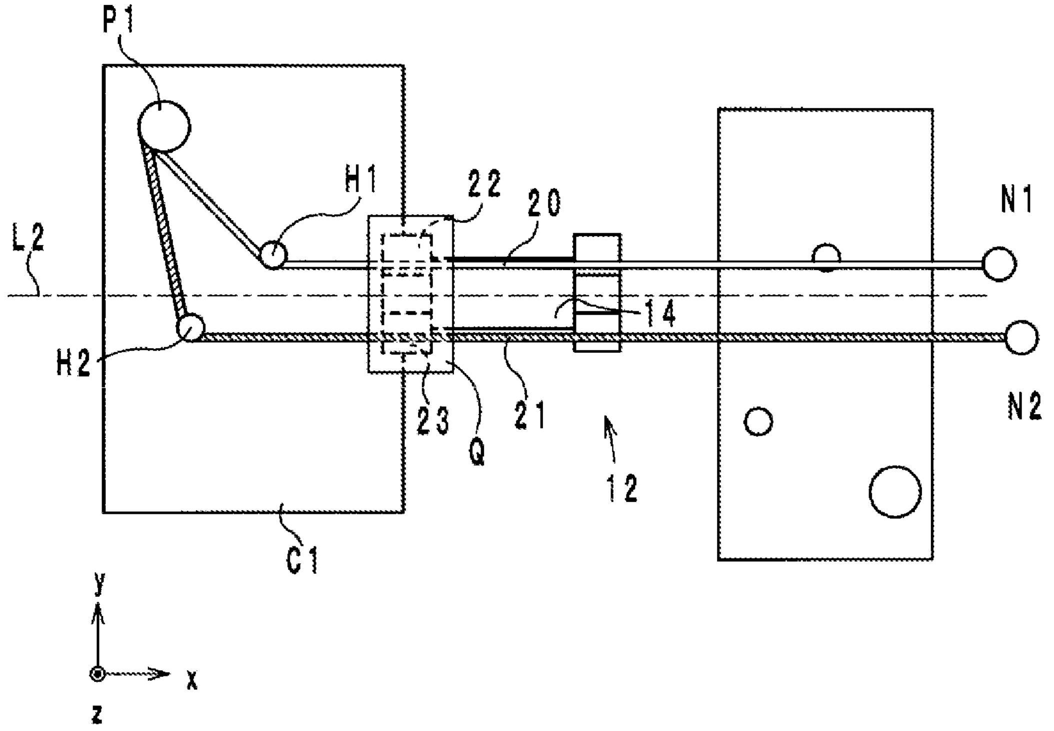
FIG. 5 is a view showing the first step of the method of manufacturing the winding-type electronic component according to the first embodiment.

Next, the windings 20, 21 are fixed to the external electrodes 22, 23, respectively. To be more specific, as shown in FIGS. 4 and 5, in a state where the windings 20, 21 are brought into contact with the external electrodes 22, 23 on the flange portion 16, a heater chip Q is pressed against the flange portion 16. With such an operation, the windings 20, 21 are thermally pressure-bonded and fixed to the external electrodes 22, 23, respectively (completion of first step).

Figure 6:
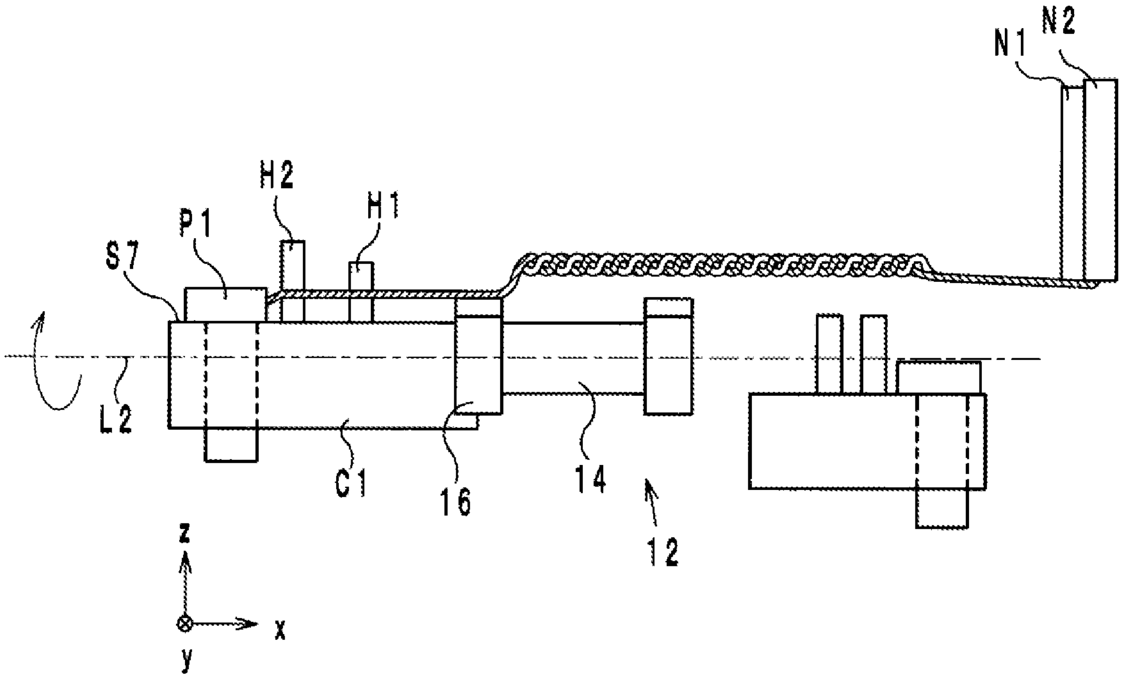
FIG. 6 is a view showing a second step of the method of manufacturing the winding-type electronic component according to the first embodiment.
Figure 7:
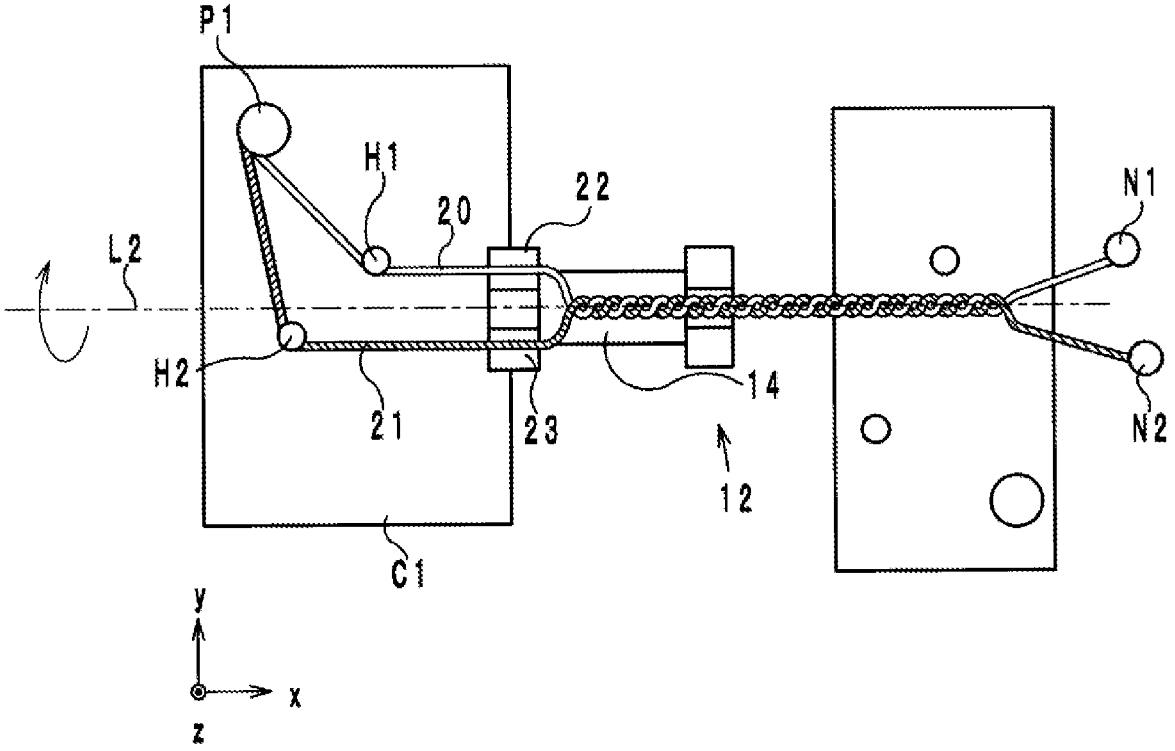
FIG. 7 is a view showing the second step of the method of manufacturing the winding-type electronic component according to the first embodiment.

After the windings 20, 21 are fixed, the chuck C1 is rotated. Due to such a rotation of the chuck C1, the windings 20, 21 are twisted as shown in FIG. 6 and FIG. 7. In this case, the nozzles N1, N2 are positioned in the vicinity of the center axis L2 of the winding core portion 14 of the core 12 and on a positive direction side in the x-axis direction with respect to the core 12; and, hence, there is no possibility that the windings 20, 21 are wound on the winding core portion 14 (completion of second step).

Figure 8:
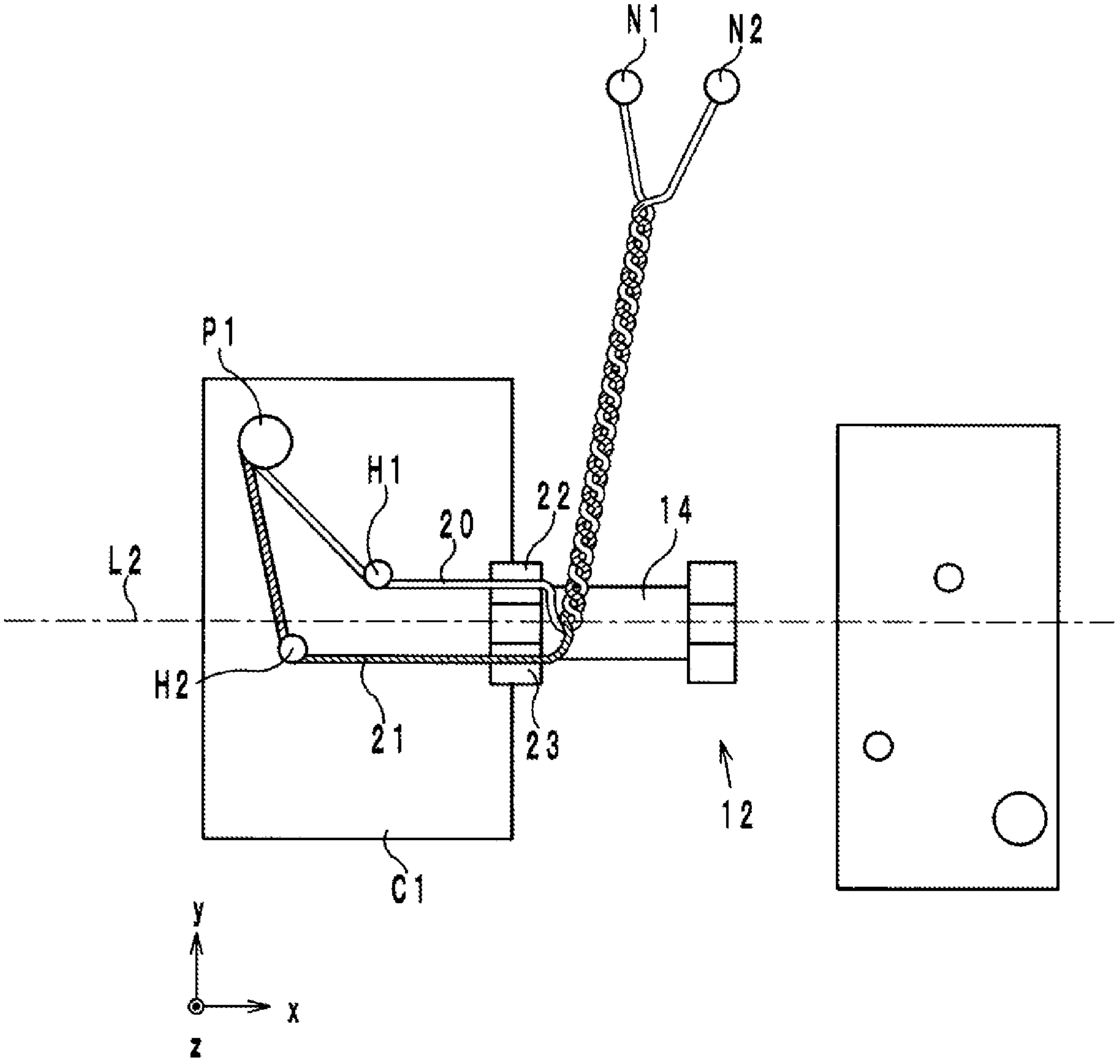
FIG. 8 is a view showing a third step of the method of manufacturing the winding-type electronic component according to the first embodiment.

The twisted windings 20, 21 are wound on the winding core portion 14. In this winding operation, firstly, as shown in FIG. 8, the positions of the nozzles N1, N2 are moved. To be more specific, the nozzles N1, N2 are moved in a direction orthogonal to the center axis L2, from positions in the vicinity of the center axis L2 of the winding core portion 14.

Figure 9:
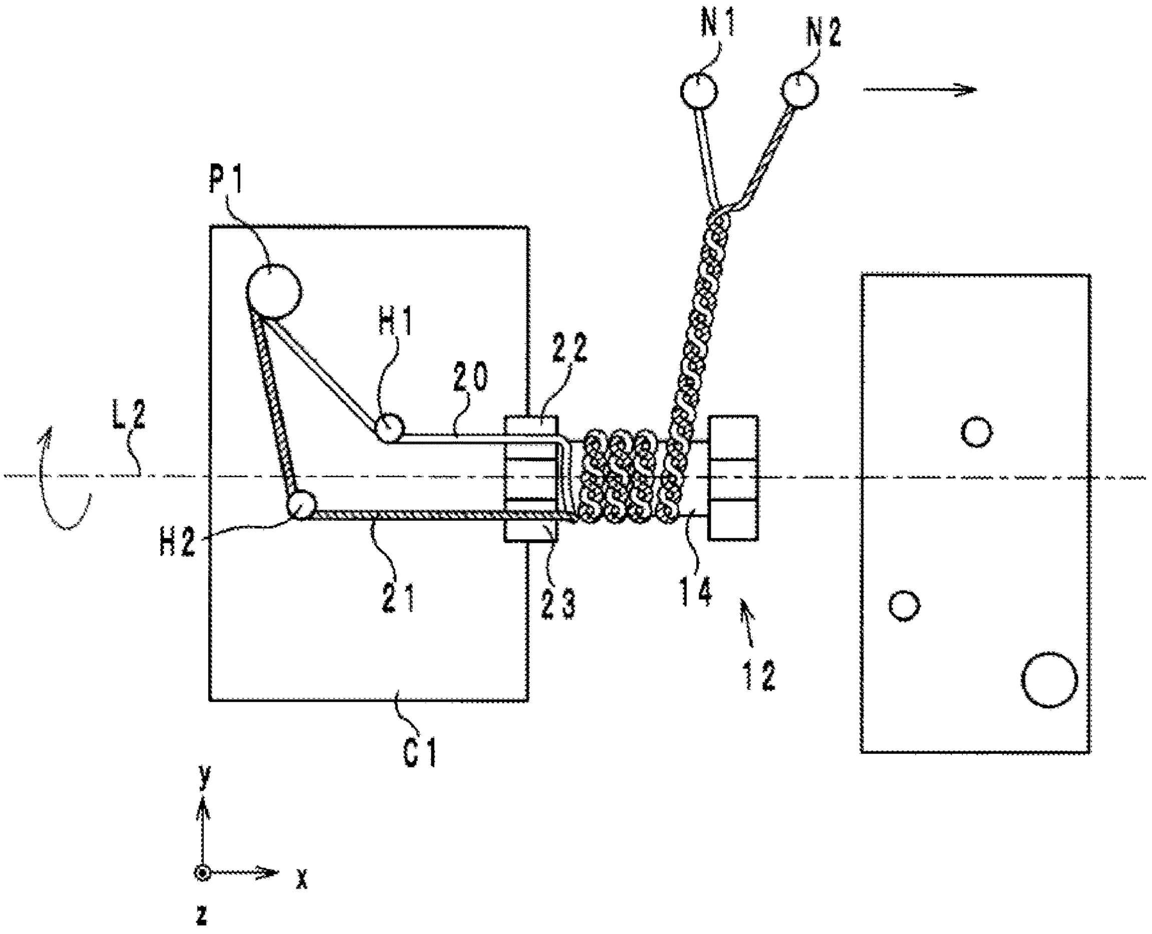
FIG. 9 is a view showing the third step of the method of manufacturing the winding-type electronic component according to the first embodiment.

Then, as shown in FIG. 9, the chuck C1 is rotated while moving the nozzles N1, N2 toward a positive direction side in the x-axis direction. With such an operation, a stranded wire formed of the windings 20, 21 is wound on the winding core portion 14 (completion of third step).

Figure 10:
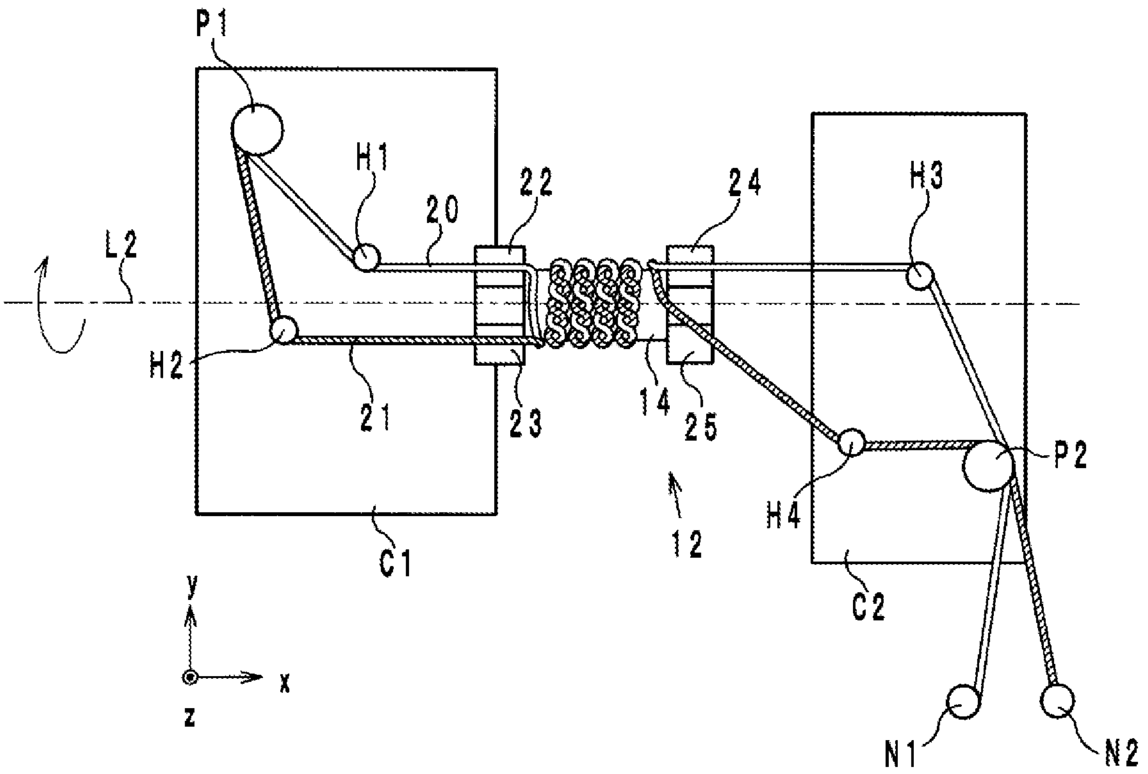
FIG. 10 is a view showing a post step of the method of manufacturing the winding-type electronic component according to the first embodiment.

Next, as shown in FIG. 10, the winding 20 is hooked on a hooking pin H3 in a rod-like shape which is provided on a guide member C2 disposed on a side opposite to the chuck C1 with the core 12 interposed between the guide member C2 and the chuck C1. To be more specific, the hooking pin H3 is disposed on a positive direction side in the x-axis direction with respect to the core 12 and is disposed at substantially the same position as that of the external electrode 24 in the y-axis direction. By bringing the winding 20 into contact with a side surface on a positive direction side in the y-axis direction of the hooking pin H3 disposed as described above, the nozzle N1 is moved to a positive direction side in the x-axis direction and to a negative direction side in the y-axis direction. Then, the winding 20 is clamped by the wire clamp P2 provided on the guide member C2. In this case, the winding 20 is hooked on the hooking pin H3 while being brought into contact with the external electrode 24.

In parallel with the operation of hooking the winding 20 on the hooking pin H3, the winding 21 is hooked on a hooking pin H4 in a rod-like shape provided on the guide member C2. To be more specific, the hooking pin H4 is disposed on a positive direction side in the x-axis direction and on a negative direction side in the y-axis direction with respect to the core 12. By bringing the winding 21 into contact with a side surface on a negative direction side in the y-axis direction of the hooking pin H4 disposed as described above, the nozzle N2 is moved to a positive direction side in the x-axis direction and to a negative direction side in the y-axis direction. Then, the winding 21 is clamped by the wire clamp P2. In this case, the winding 21 is hooked on the hooking pin H4 while being brought into contact with the external electrode 25.

Next, the windings 20, 21 are connected to the external electrodes 24, 25, respectively. To be more specific, in a state where the windings 20, 21 are brought into contact with the external electrodes 24, 25 on the flange portion 18, a heater chip is pressed against the flange portion 18. Finally, surplus portions of the windings 20, 21 which project to the outside of the core 12 from the flange portion 16 and surplus portions of the windings 20, 21 which project to the outside of the core 12 from the flange portion 18 are cut. With such operations, the winding-type electronic component 1 is completed.

Advantageous Effect

In the method of manufacturing a winding-type electronic component according to the first embodiment, the plurality of windings 20, 21 is fixed to the flange portion 16 of the core 12, and the plurality of windings 20, 21 is twisted by rotating the chuck C1 which holds the core 12. Accordingly, unlike the conventional method of manufacturing a winding-type electronic component, the nozzles are not rotated; and, hence, there is no possibility that the plurality of windings is twisted between the tensioner and the nozzles. As a result, in the manufacturing method of this embodiment, a tension force from the tensioner can be transmitted to the windings 20, 21 and, further, it is possible to suppress the occurrence of the disconnection of the windings 20, 21 between the tensioner and the nozzles N1, N2.

Here, in the conventional method of manufacturing a winding-type electronic component, in order to eliminate a state where the plurality of windings is twisted between the tensioner and the nozzles, the rotational direction of the nozzles is reversed in the midst of winding a stranded wire formed of the plurality of windings on the winding core portion. As a result, a stranding direction of the stranded wire is reversed at an intermediate portion of the winding core portion. On the other hand, in the method of manufacturing a winding-type electronic component according to this embodiment, the nozzles are not rotated; and, hence, a state where the plurality of windings is twisted between the tensioner and the nozzles does not occur, and accordingly, there is no possibility that the stranding direction of a stranded wire formed of the windings 20, 21 is reversed at an intermediate portion of the winding core portion 14.

Second Embodiment: See FIG. 11

Figure 11:
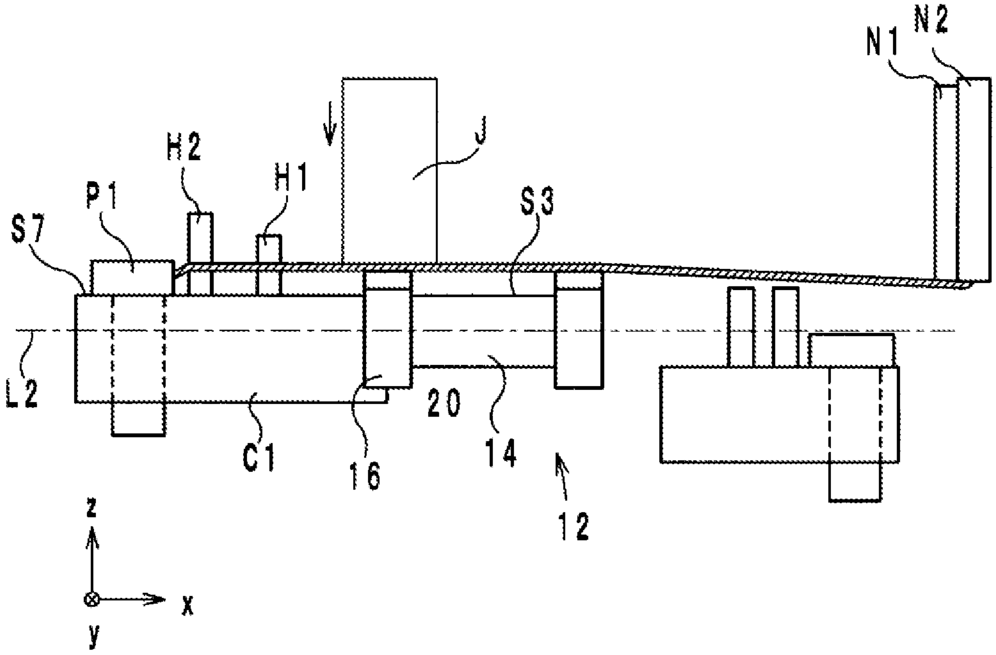
FIG. 11 is a view showing a first step of a method of manufacturing a winding-type electronic component according to a second embodiment.

The difference between a method of manufacturing a winding-type electronic component according to a second embodiment and the method of manufacturing a winding-type electronic component according to the first embodiment lies in the method of fixing windings 20, 21 to a flange portion 16. In the method of manufacturing a winding-type electronic component according to the second embodiment, as shown in FIG. 11, the windings 20, 21 are clamped between a jig J and the flange portion 16 so that the windings 20, 21 are fixed to external electrodes 22, 23, respectively, provided on the flange portion 16 in a state where the windings 20, 21 are pressed against the external electrodes 22, 23, respectively (first step).

In the method of manufacturing a winding-type electronic component according to the second embodiment, as it is unnecessary to perform pressure bonding for fixing the windings 20, 21 to the flange portion 16 before a step of winding the windings 20, 21 (third step), a step of pressure-bonding the windings 20, 21 to the external electrodes 22, 23 can be performed simultaneously with a step of pressure bonding the windings 20, 21 to the external electrodes 24, 25. Accordingly, in the method of manufacturing a winding-type electronic component according to the second embodiment, the manufacturing step can be further simplified compared to the method of manufacturing a winding-type electronic component according to the first embodiment.

Other configurations and the manner of operation and advantageous effects of the method of manufacturing a winding-type electronic component according to the second embodiment are substantially equal to the corresponding configurations and manner of operation and advantageous effects of the method of manufacturing a winding-type electronic component according to the first embodiment.

Third Embodiment: See FIGS. 12 17

The difference between a method of manufacturing a winding-type electronic component according to a third embodiment and the method of manufacturing a winding-type electronic component according to the first embodiment lies in the method of fixing windings 20, 21 to a flange portion 16. The difference is described specifically hereinafter.

Figure 12:
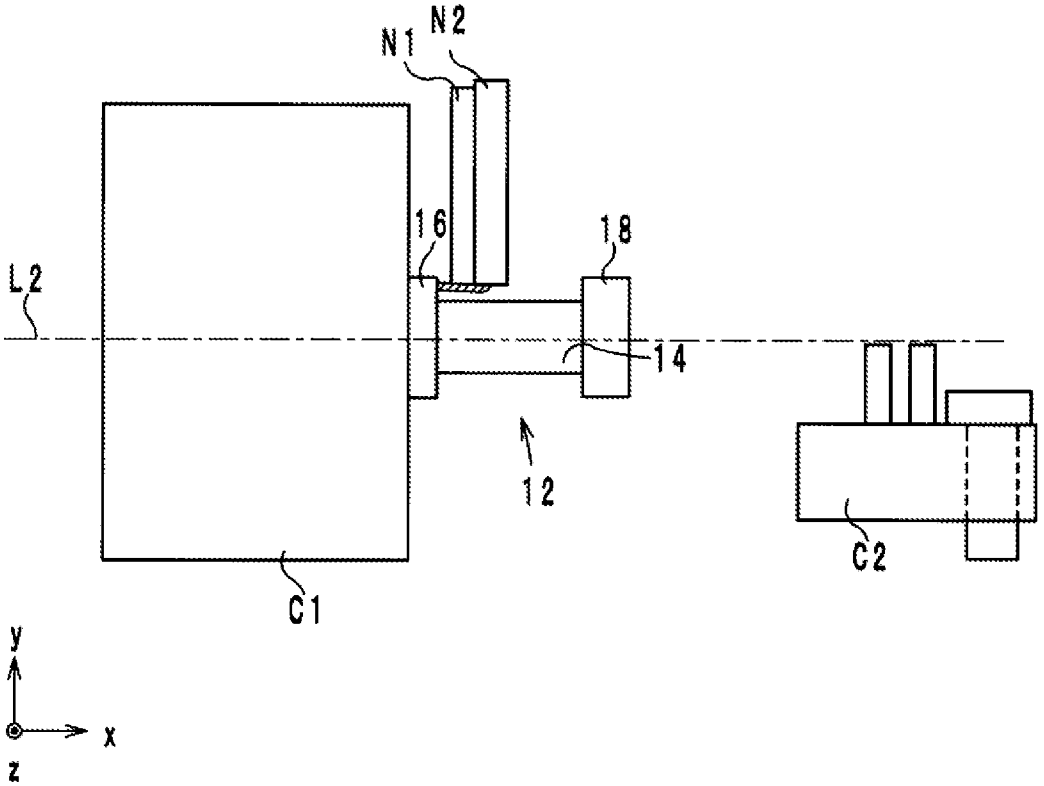
FIG. 12 is a view showing a first step of a method of manufacturing a winding-type electronic component according to a third embodiment.
Figure 13:
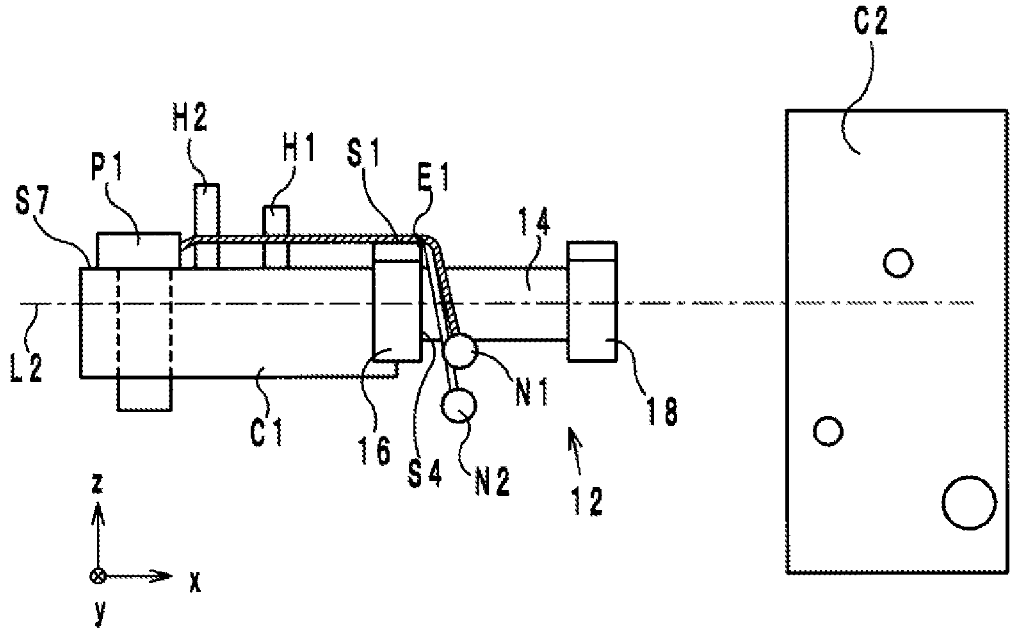
FIG. 13 is a view showing the first step of the method of manufacturing the winding-type electronic component according to the third embodiment.

In the method of manufacturing a winding-type electronic component according to the third embodiment, after the windings 20, 21 are hooked on hooking pins H1, H2 of a chuck C1, the chuck C1 is rotated by approximately 90°. With such an operation, as shown in FIGS. 12 and 13, the windings 20, 21 are hooked on a corner portion E1 made by a surface S1 of the flange portion 16 and a surface S4 of the flange portion 16 on a positive direction side in the x-axis direction.

Figure 14:
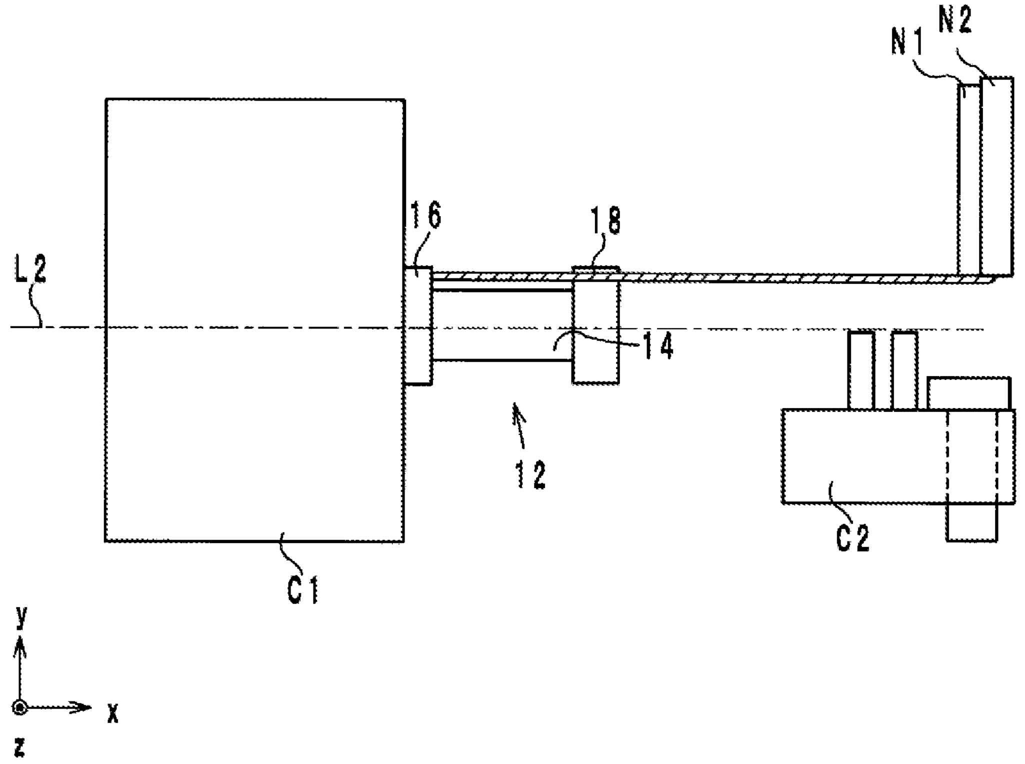
FIG. 14 is a view showing the first step of the method of manufacturing the winding-type electronic component according to the third embodiment.
Figure 15:
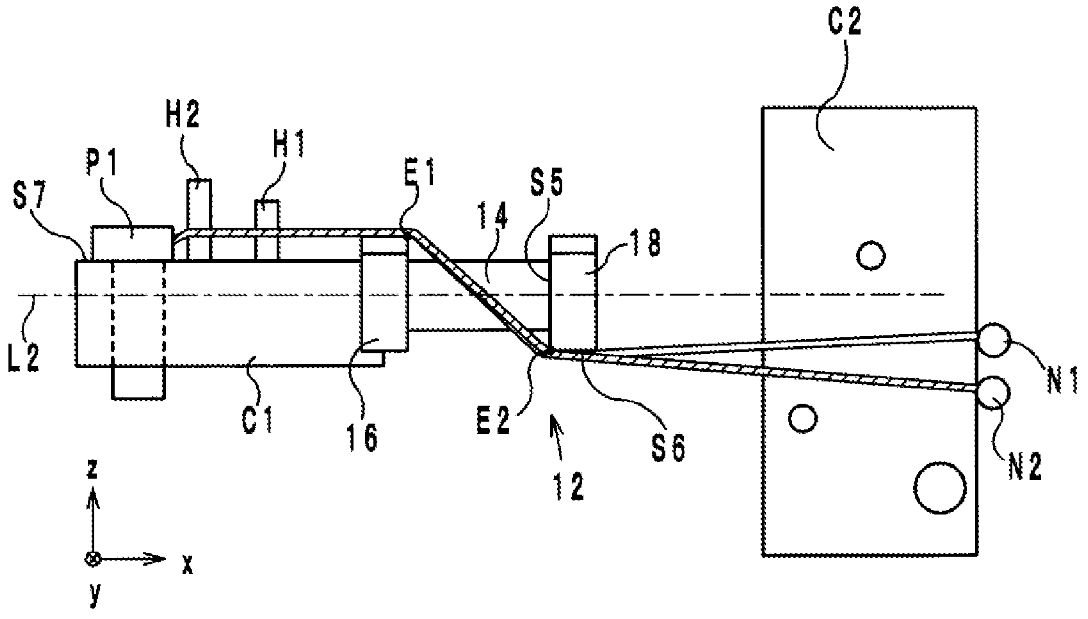
FIG. 15 is a view showing the first step of the method of manufacturing the winding-type electronic component according to the third embodiment.
Figure 16:
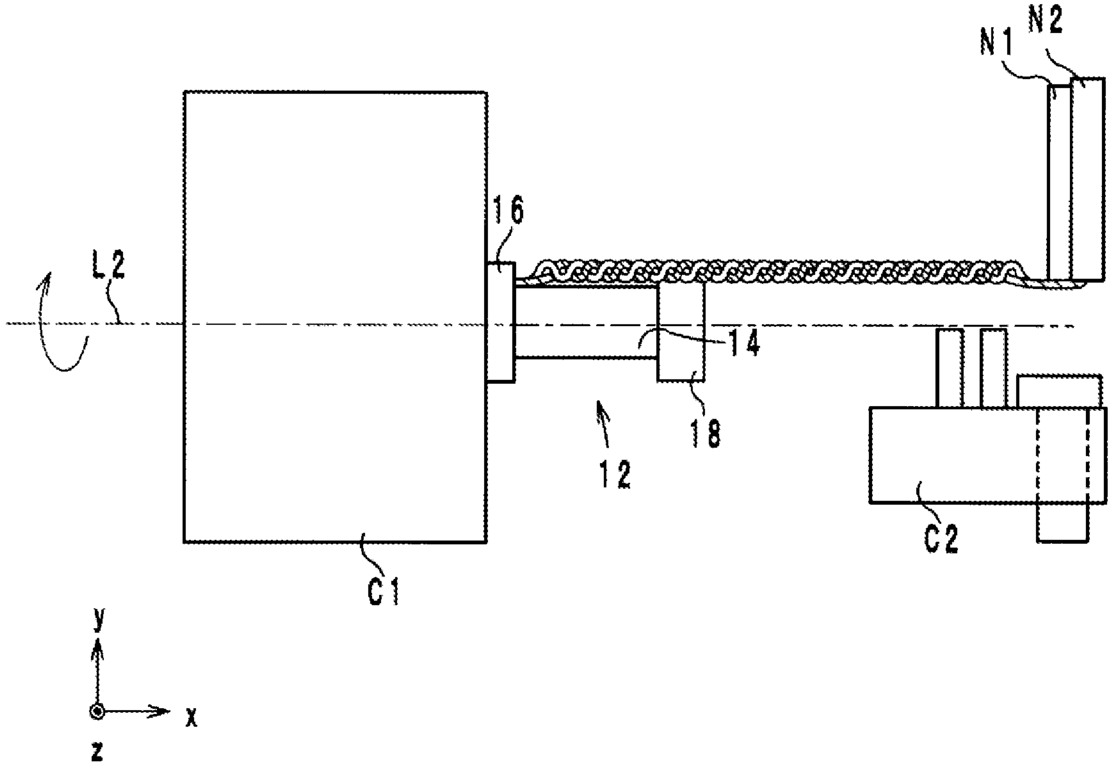
FIG. 16 is a view showing a second step of the method of manufacturing the winding-type electronic component according to the third embodiment.
Figure 17:
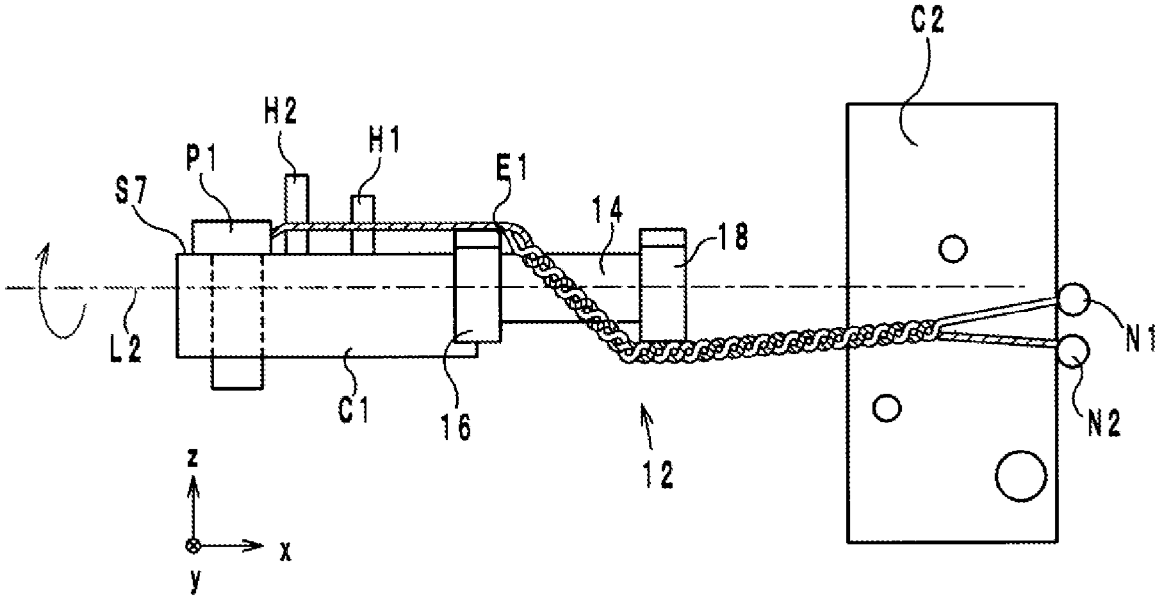
FIG. 17 is a view showing the second step of the method of manufacturing the winding-type electronic component according to the third embodiment.

Next, as shown in FIGS. 14 and 15, in a state where the windings 20, 21 are hooked on a corner portion E2 made by a surface S5 of a flange portion 18 on a negative direction side in the x-axis direction and a surface S6 of the flange portion 18 on a negative direction side in the y-axis direction, the nozzles N1, N2 are moved to a positive direction side in the x-axis direction with respect to the core 12. With such an operation, the windings 20, 21 are fixed in a state where the windings 20, 21 are pressed against the corner portion E1 of the flange portion 16 (completion of first step). Thereafter, by further rotating the chuck C1, the windings 20, 21 can be twisted as shown in FIGS. 16 and 17 (completion of second step).

In the method of manufacturing a winding-type electronic component according to the third embodiment, the pressure bonding is unnecessary for fixing the windings 20, 21 to the flange portion 16; and, hence, a step of pressure bonding the windings 20, 21 to the external electrodes 22, 23 can be performed simultaneously with a step of pressure bonding the windings 20, 21 to external electrodes 24, 25. Accordingly, in the method of manufacturing a winding-type electronic component according to the third embodiment, the manufacturing step of a winding-type electronic component can be further simplified as compared to the method of manufacturing a winding-type electronic component according to the first embodiment.

Further, in the method of manufacturing a winding-type electronic component according to the third embodiment, unlike the method of manufacturing a winding-type electronic component according to the second embodiment, a jig J for fixing the windings 20, 21 to the flange portion 16 is also unnecessary. Accordingly, in the method of manufacturing a winding-type electronic component according to the third embodiment, a manufacturing apparatus used in the manufacturing method can be further simplified.

Other configurations and the manner of operation and advantageous effects of the method of manufacturing a winding-type electronic component according to the third embodiment are substantially equal to the corresponding configurations and manner of operation and advantageous effects of the method of manufacturing a winding-type electronic component according to the first embodiment.

Modification

Figure 18:
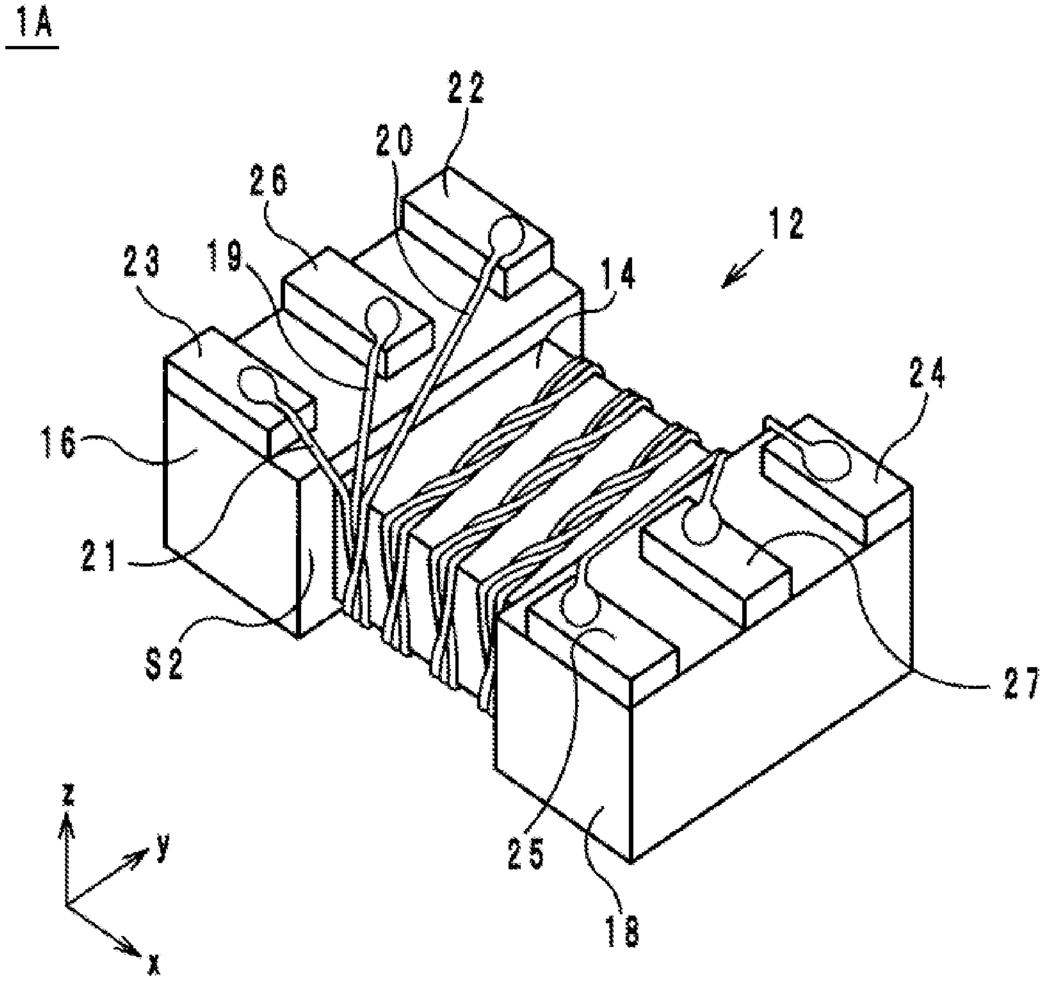
FIG. 18 is an external appearance view of a winding-type electronic component manufactured by a method of manufacturing a winding-type electronic component according to a modification.
Figure 19:
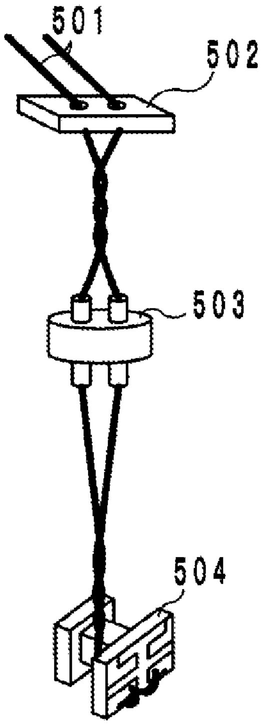
FIG. 19 is a view showing a step of a method of manufacturing a conventional winding-type electronic component.

In a method of manufacturing a winding-type electronic component according to a modification, the number of windings to be twisted is set to three instead of two, unlike any one of the above-mentioned manufacturing methods. By setting the number of windings to be twisted to three, as shown in FIG. 18, it is possible to manufacture a winding-type electronic component 1A which includes a winding 19 in addition to the windings 20, 21. However, in the winding-type electronic component 1A, three windings are wound on the winding core portion 14; and, hence, external electrodes 26, 27 are newly added to the winding-type electronic component 1.

Other configurations and the manner of operation and advantageous effects of the method of manufacturing a winding-type electronic component according to the modification are substantially equal to the corresponding configurations and manner of operation and advantageous effects of the methods of manufacturing a winding-type electronic component according to the first to third embodiments.

Another Embodiment

The method of manufacturing a winding-type electronic component according to the present disclosure is not limited to the above-mentioned embodiments, and various modifications are conceivable without departing from the gist of the present disclosure. For example, a length that the windings 20, 21 are twisted by rotating the chuck C1 can be changed depending on lengths of the windings 20, 21 wound on the winding core portion 14. Further, shapes and positions of the clamp and the hooking pins are arbitrarily set. Still further, the configurations of the respective embodiments may be combined with each other.

INDUSTRIAL APPLICABILITY

As has been described heretofore, the present disclosure is usefully applicable to a method of manufacturing a winding-type electronic component, and provides excellence in suppressing a disconnection of the winding when a plurality of windings is twisted in the method of manufacturing a winding-type electronic component using stranded wires.

The invention claimed is:

1. A method of manufacturing a winding-type electronic component, comprising:

providing a core having a winding core portion and flange portions and a chuck that holds the core, fixing a portion of each of a plurality of windings supplied from a nozzle to one of the flange portions, the plurality of windings each comprising a plurality of wires;

twisting the plurality of windings to cause the plurality of wires to be twisted about one another; and winding the plurality of windings with the plurality of wires that are twisted about one another during the twisting on the winding core portion by rotating the chuck.

2. The method of manufacturing a winding-type electronic component according to claim 1, wherein the fixing of the portion of each of the plurality of windings is performed by thermally pressure-bonding the plurality of windings to electrodes provided on the flange portions.

3. The method of manufacturing a winding-type electronic component according to claim 1, wherein the fixing of the portion of each of the plurality of windings is performed by pressing the plurality of windings against electrodes which are provided on the flange portions.

4. The method of manufacturing a winding-type electronic component according to claim 1, wherein the fixing of the portion of each of the plurality of windings is performed by hooking the plurality of windings to corner portions of the flange portions.

5. The method of manufacturing a winding-type electronic component according to claim 1, wherein the plurality of windings include three or more wires.

6. A method of manufacturing a winding-type electronic component comprising:

allowing a rotatable chuck to hold a core having a winding core portion and flange portions;

fixing a portion of each of a plurality of windings supplied from a nozzle to one of the flange portions, the plurality of windings each comprising a plurality of wires; and twisting the plurality of windings to cause the plurality of wires to be twisted about one another without rotating the nozzle.

* * * * *